Jan. 20, 1959  E. C. SHOUP, JR., ET AL  2,869,941
TURBINE BEARING SUPPORT

Filed April 29, 1957  2 Sheets-Sheet 1

INVENTORS
EDGAR C. SHOUP JR.
ROBERT W. DIXON
BY Charles Allensen
ATTORNEY

United States Patent Office 2,869,941
Patented Jan. 20, 1959

2,869,941

TURBINE BEARING SUPPORT

Edgar C. Shoup, Jr. and Robert W. Dixon, Glastonbury, Conn., assignors to United Aircraft Corporation, East Hartford, Conn., a corporation of Delaware Application April 29, 1957, Serial No. 655,668

6 Claims. (Cl. 308—184)

This invention relates to a bearing support for a gas turbine power plant and especially to the support for a bearing located at the downstream side of the turbine.

The bearings have been supported by a housing located concentrically within the turbine casing by radially or tangentially extending supporting rods between the housing and the surrounding casing. These supporting rods extend across the annular exhaust duct for which the casing normally forms the outer wall. Thus, of necessity, these rods are subject to substantial temperature changes dependent upon the temperature of the exhaust gas from the turbine and such temperature changes affect the mounting of the rods by the resultant changes in the length of the rods. One feature of this invention is an arrangement by which to support the bearing housing from the support rods by a connection which permits relative expansion of the part without a necessity for a slidable connection between the parts and without over stressing the parts. Another feature is an arrangement by which to provide a limited radial deflection of the bearing housing within the outer casing especially as a result of loading applied to the bearing during engine operation. Another feature is a resilient structure by which to resist the bearing deflection within the casing.

One feature of this invention is a two-rate bearing such that small deflections of the housing are resisted resiliently at one spring rate and more severe deflections under heavy loads such as maneuver loading are resisted by a heavier spring rate.

Other features and advantages will be apparent from the specification and claims, and from the accompanying drawings which illustrate an embodiment of the invention.

Figure 1:
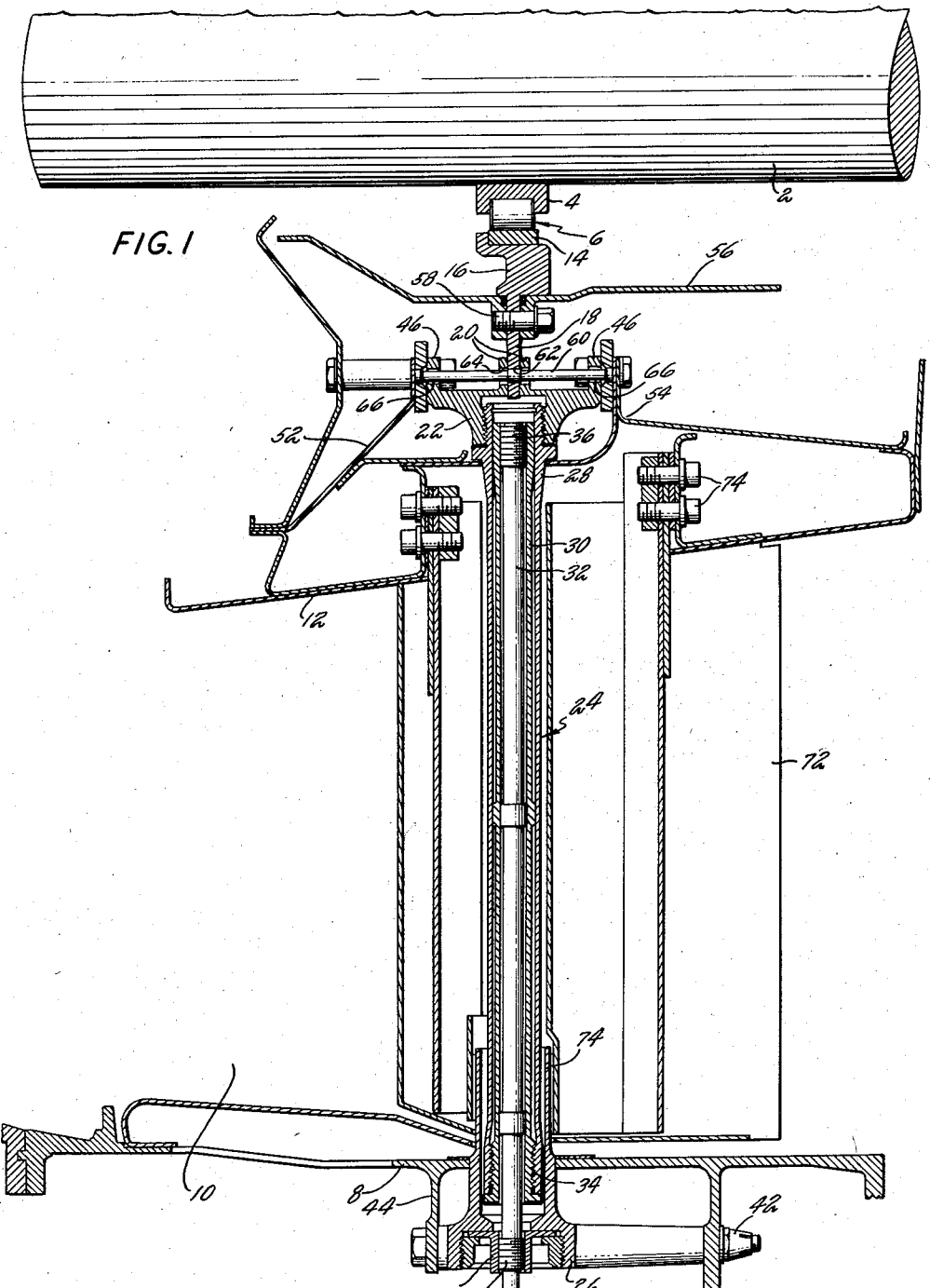
Fig. 1 is an axial sectional view showing a support rod for the turbine bearing.
Figure 2:
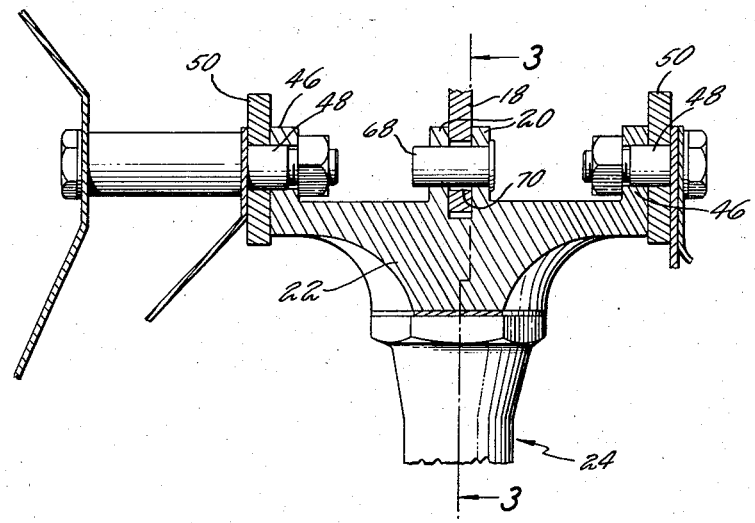
Fig. 2 is an enlarged sectional view substantially along the line 2—2 of Fig. 3.

With reference to Fig. 1, the turbine shaft 2 carries the inner race 4 of the bearing 6 which is intended to position the shaft 2 substantially concentrically within the outer turbine casing 8. This casing forms the outer wall of the annular duct 10 through which exhaust gas from the turbine is discharged. The inner wall of the exhaust duct is formed by the tailcone 12 which surrounds the bearing and is held in spaced relation to the outer wall and in concentric relation to the bearing by structure described later. The arrangement shown is intended for use on the downstream side of a turbine disc in an axial flow gas turbine power plant as shown, for example, in the Savin Patent 2,747,367.

Figure 3:
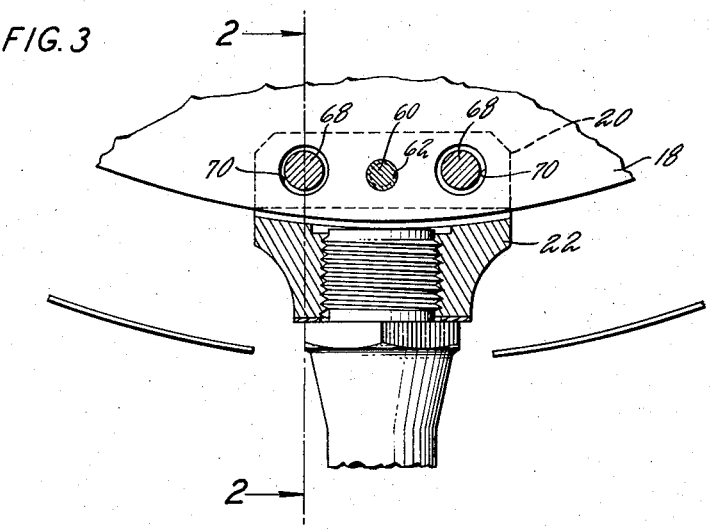
Fig. 3 is a sectional view along the line 3—3 of Fig. 2.

The outer race 14 of the bearing is supported by a housing 16 having a radially projecting circumferentially extending rib 18. This rib 18 is received between spaced ribs 20 on a bracket 22 attached to the inner end of a radially extending support rod 24, the latter extending outwardly through the casing 8 and being secured at its outer end within a bracket 26. The rod 24 may have a threaded engagement with the bracket 22, as shown in Fig. 3. Although the rod 24 may be of somewhat conventional construction, it is shown in the drawings as a so-called folded rod in which the rod consists of concentric sleeves 28 and 30 and a centrally positioned rod 32. The outer end of sleeve 28 is attached as by threads 34 to the outer end of the sleeve 30 and the inner end of sleeve 30 is attached as by threads 36 to the inner end of rod 32. The outer end of rod 32 is engaged by threads 38 on a ring 40 received within the bracket 26. The latter is supported by bolts 42 between spaced circumferentially extending flanges 44 on the outside of the casing 8.

The support rods are preferably made to minimize thermal effects on the assembly. To this end the outer sleeve 28 and inner rod 32 are made of a low thermal expansion material such as A. M. S. 5616 and the middle tube 30 of a high thermal expansion material such as A. M. S. 5735. The increase in the length of tube 30 with an increase in temperature subtracts from the increase in length of the tube 28 and rod 32 to produce an extremely small change in over-all dimension of the rod 24 and accordingly a minimum of stresses resulting from thermal changes.

The bracket 22, in addition to the flanges 20 that straddle the rib 18, also has spaced apart flanges 46 on opposite sides of the centrally located flanges. These flanges are secured as by bolts 48 to spaced rings 50. It will be understood that around the periphery of the housing 16 there will be a plurality of the support brackets 22 and support rods 24 which would be angularly spaced apart and normally with a uniform spacing and that the several brackets 22 will all be secured to the pair of rings 50. The bolts 48 serve, in addition to holding the brackets to the rings 50, as a support for the tailcone 12 as by the use of the flanged rings 52 and 54 positioned within the tailcone. The rib 18 may have mounted thereon axially extending heat shields 56, these shields being held in place as by bolts 58.

In order to provide a limited amount of resilience in the support for the bearing, the rib 18 carries at each bracket 22 an axially extending spring pin 60, the center of which is a tight fit within an opening 62 in the rib 18 and the ends of which are a tight fit within the rings 50. In order to permit a relative radial movement between the bracket 22 and the rib 18, the flanges 20 and 46 have openings 64 and 66, respectively, which surround and are larger in diameter than the pin 60. With this arrangement, as will be clear from Fig. 1, the rib 18 is free to move in a radial direction with respect to the bracket 22, the movement being opposed by the resilience of the pin 60.

A limit to the movement of the rib 18 with respect to the bracket 22 is imposed by providing pins 68 which are a tight fit within the flanges 20 and a loose fit within openings 70 provided by the flange 18. Thus, as the flange moves against the resilience of the pins 60, the relative movement is limited by contact between the pins 68 and the peripheries of the openings 70. When this limit of movement is reached further deflection will be resisted by the spring rate of the assembly of the brackets 22 and rods 24.

The rods 24 may be shielded from the hot exhaust gases in the duct 10 by fairings or vanes 72 positioned around the rods and supported at their inner ends as by bolts 74 which serve to attach the vanes to the tailcone structure. At the outer ends these vanes may be guided by a sleeve 74 integral with the bracket 26 and projecting inwardly from the wall of the casing 8.

It is to be understood that the invention is not limited to the specific embodiment herein illustrated and described, but may be used in other ways without departure from its spirit as defined by the following claims.

We claim:

1. In a turbine construction, an annular casing, a bearing housing positioned centrally within the casing in spaced relation thereto, and support rods extending inwardly from said casing to said housing, in combination with a connection between said rods and said housing to limit the radial movement of said housing with respect to each rod, said connection including spring members for resiliently resisting such movement.

2. In a turbine construction, an annular casing, a bearing housing positioned centrally within the casing in spaced relation thereto, and support rods extending inwardly from said casing to said housing, in combination with a connection between said rods and said housing to limit the movement of said housing with respect to each rod, said connection including for each rod a spring member operative for resisting a predetermined movement of said housing and other means operative to resist further movement.

3. In a turbine construction, an annular casing, a bearing housing member positioned centrally within the casing in spaced relation thereto, and spaced rod members extending inwardly from said casing to said housing, in combination with a connection between said rod member and said housing member to limit the movement of said housing member with respect to each rod member, said connection including a bracket on one of said members having spaced supporting ribs thereon, a projecting flange on the other member positioned between and spaced from said supporting ribs, and a pin carried by said supporting ribs and engaging with said projecting flange.

4. In a turbine construction, an annular casing, a bearing housing member positioned centrally within the casing in spaced relation thereto, and spaced rod members extending inwardly from said casing to said housing, in combination with a connection between said rod and said housing member to limit the movement of said housing member with respect to each rod member, said connection including a bracket on one of said members having spaced supporting ribs thereon, a projecting flange on the other member positioned between and spaced from said supporting ribs and a pin carried by said supporting ribs and engaging with said projecting flange, the member having the spaced ribs also having other ribs between said spaced ribs and located close to and on opposite sides of said projecting flanges and a pin extending through said other ribs and having a loose fit in said projecting flange.

5. In a turbine construction, an annular casing, a bearing housing positioned centrally within the casing in spaced relation thereto, support rods extending inwardly from said casing toward said housing and a ring surrounding said housing in spaced relation thereto and in concentric spaced relation to said casing, said ring being secured to the inner ends of rods, in combination with a connection between said ring and said housing to limit the radial movement of said housing with respect to said ring, said connection including spring members for resiliently resisting such radial movement.

6. In a turbine construction, an annular casing, a bearing housing positioned centrally within the casing in spaced relation thereto, support rods extending inwardly from said casing to said housing and a pair of concentric spaced rings surrounding said housing in spaced relation thereto and in concentric spaced relation to said casing, a bracket on the end of each rod, said rings being secured to the brackets on the inner ends of rods, in combination with a connection between said rings and said housing to limit the radial movement of said housing with respect to said ring, said connection including spaced supporting ribs on the bracket, a projecting flange on the housing positioned between and spaced from said support ribs and a pin carried by said support ribs and engaging with said projecting flange.

References Cited in the file of this patent

UNITED STATES PATENTS

| | | |
|---|---|---|
| 2,603,540 | Mierley et al. | July 15, 1952 |
| 2,616,662 | Mierley | Nov. 4, 1952 |
| 2,724,621 | Kenney | Nov. 22, 1955 |